United States Patent
Bhupati et al.

(10) Patent No.: US 11,507,366 B1
(45) Date of Patent: Nov. 22, 2022

(54) DYNAMICALLY CONTROLLED CHECK-IN FREQUENCY FOR AN UPDATE MANAGEMENT SYSTEM

(71) Applicant: Microsoft Technology Licensing, LLC, Redmond, WA (US)

(72) Inventors: Dhirendra Kumar Bhupati, Sammamish, WA (US); Raj Thilak Ramaswami Balakrishnan, Sammamish, WA (US); Sridhar Dantuluri, Redmond, WA (US); Xiaodong Gong, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/354,846

(22) Filed: Jun. 22, 2021

(51) Int. Cl.
  *G06F 16/23* (2019.01)
  *G06F 8/65* (2018.01)
  *G06N 20/00* (2019.01)

(52) U.S. Cl.
  CPC .......... *G06F 8/65* (2013.01); *G06F 16/2379* (2019.01); *G06N 20/00* (2019.01)

(58) Field of Classification Search
  CPC .................................................. G06F 16/23
  See application file for complete search history.

(56) References Cited

U.S. PATENT DOCUMENTS

| 7,853,609 | B2 | 12/2010 | Dehghan et al. | |
| 2009/0325686 | A1* | 12/2009 | Davis | G07F 17/3239 463/25 |
| 2015/0123787 | A1* | 5/2015 | Watson | G06Q 10/06 340/539.13 |
| 2018/0018608 | A1* | 1/2018 | Braun | G07C 5/0841 |

FOREIGN PATENT DOCUMENTS

EP       3313080 A1    4/2018

OTHER PUBLICATIONS

Gerend, et al., "Step 4: Configure Group Policy Settings for Automatic Updates", Retrieved From: https://web.archive.org/web/20210621114034/https://docs.microsoft.com/en-US/windows-server/administration/windows-server-update-services/deploy/4-configure-group-policy-settings-for-automatic-updates, Oct. 16, 2017, 34 Pages.
"International Search Report and Written Opinion Issued in PCT Application No. PCT/US22/029108", dated Aug. 26, 2022, 11 Pages.

* cited by examiner

*Primary Examiner* — Jae U Jeon
(74) *Attorney, Agent, or Firm* — NovoTechIP International PLLC

(57) ABSTRACT

A system and method for a software update management system which provides control over the distribution of software updates and increases payload distribution efficiency by providing a dynamically controlled next check-in frequency to each endpoint of the system. The system may use information provided from other services stored in a service database to determine the next check-in frequency. The update management system may further incorporate machine learning to optimize the next check-in frequency for each endpoint.

20 Claims, 4 Drawing Sheets

| tenantID | deviceID | scaling_factor | historic_check-in frequency | current_network_load | severity_score | non_empty_payload_rate | next_check-in freq. |
|---|---|---|---|---|---|---|---|
| 1 | 1 | 1 | 90 | 0.75 | 0.5 | 0.8 | 160 |
| 1 | 1 | 1 | 90 | 0.9 | 0.5 | 0.8 | 190 |
| 1 | 1 | 1.1 | 90 | 0.75 | 0.5 | 0.5 | 209 |
| 1 | 1 | 1 | 135 | 0.75 | 0.5 | 0.8 | 205 |
| 1 | 1 | 1 | 140 | 0.75 | 1 | 0.6 | 155 |
| 1 | 1 | 1 | 145 | 0.75 | 1 | 0.8 | 140 |
| 1 | 1 | 1 | 142 | 0.75 | 0.1 | 0.8 | 812 |
| 1 | 1 | 1 | 400 | 0.75 | 0.3 | 0.764 | 573.6 |
| 1 | 1 | 0.8 | 450 | 0.75 | 0.3 | 0.764 | 498.88 |

FIG. 2

DYNAMICALLY CONTROLLED CHECK-IN FREQUENCY FOR AN UPDATE MANAGEMENT SYSTEM

TECHNICAL FIELD

The disclosure relates generally to update management of software for computer systems and, more particularly, to a system and method for dynamically controlled check-in frequency to optimize service peak load and velocity of change management in an update management system.

BACKGROUND

Many computer software products undergo a continual revision process to repair or update features of the software located on various endpoint computer systems, hereinafter referred to as "endpoints". Endpoints may include servers, desktop computers, laptops, smart phones or any other computer system. The revision process may require adding new files, replacing existing files with newer revisions, or deleting obsolete files. This revision process is often referred to as "updating the product." The data collection, including binary files, data files, update instructions, metadata, and the like, used in updating the product may be referred to as an "update." For various reasons, software providers may issue frequent updates for their software. Furthermore, the software providers have a business incentive to distribute software updates to their customers as quickly and as trouble-free as possible. Frequently, these software updates to the endpoints are conducted at pre-determined intervals automatically over the Internet, without any user intervention.

SUMMARY

Networks, including the Internet, possess only a finite amount of communication resources, often referred to as bandwidth. A finite amount of communication bandwidth frequently results in bottlenecks in an update management system, including when performing software updates for large software products such operating systems and related productivity products. Given the possibility of bandwidth bottlenecks, there is a need for systems and methods to reduce the load on an update management system. A system and method is described for an extensible software update management system which provides control over the distribution of software updates and increases payload distribution efficiency by providing a dynamically controlled next check-in frequency. The system may use information provided from other services and may further incorporate machine learning to determine the next check-in frequency.

The disclosure and claims herein are directed to a system and method for a software update management system which provides control over the distribution of software updates and increases payload distribution efficiency by providing a dynamically controlled next check-in frequency to each endpoint of the system. The update management system determines a dynamic next check-in frequency for each endpoint and may further incorporate machine learning to determine the next check-in frequency.

A device for dynamically controlling a next check-in frequency in an update management system includes, a processor; and a memory in communication with the processor, the memory comprising executable instructions that, when executed by the processor, cause the processor to control the device to perform functions of receiving a check-in request from an endpoint; posting a message on a message bus with check-in information including a check-in time; storing the check-in time of the message in a database by device and tenant; generating a next check-in frequency for each endpoint based on information stored in the database; and replying to endpoints with the generated next check-in frequency allowing the endpoints to send future check-in requests with the next check-in frequency.

In another implementation, a method of operating a device includes receiving a check-in request from an endpoint; posting a message on a message bus with check-in information including a check-in time; storing the check-in time of the message in a database by device and tenant; generating a next check-in frequency for each endpoint based on information stored in the database; and replying to endpoints with the generated next check-in frequency allowing the endpoints to send future check-in requests with the next check-in frequency.

In another implementation, a method of operating a device, includes receiving a check-in request from an endpoint; posting a message on a message bus with check-in information including a check-in time; storing the check-in time of the message in a database by device and tenant; generating a next check-in frequency for each endpoint based on information stored in the database; and replying to endpoints with the generated next check-in frequency allowing the endpoints to send future check-in requests with the next check-in frequency; and other services subscribing to check-in events on the message bus determining what actions the endpoint needs to perform, wherein the actions the endpoint needs to perform are sent to the endpoint in the reply with the generated next check-in frequency; and providing a severity score of other services which is then used to generate the next check-in frequency; wherein the next check-in frequency is generated using the severity score, a historic check-in frequency, a current network load, and a non-empty payload rate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 illustrates a table with metrics and parameters for a next check-in algorithm as described herein.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to a system and method for an extensible software update management system for providing control over the distribution of software updates which increases payload distribution efficiency by providing a dynamically controlled next check-in frequency which may further incorporate machine learning.

Endpoints typically send a check-in request to an update management system. The update management system determines whether an update is needed by the endpoint sending the check-in request. When an updated is needed, the update management system provides a change payload to be delivered to the endpoint. Often no update is needed for many endpoints when the check-in request is sent. This creates a technical problem where frequent unneeded check-in requests consume cloud resources and increase loading on the update management system which may delay delivery of payloads to endpoints which need an update and might have received the change payload earlier in the absence of the traffic from other endpoints for which there was no payload needed.

In light of the various above-identified technical problems relating to software update distribution, the disclosure herein provides an extensible software update distribution system for providing control over the distribution of software updates which increases payload distribution efficiency by providing a dynamically controlled check-in frequency. The system may use information provided from other services stored in a service database to determine the next check-in frequency. The update management system may further incorporate machine learning to optimize the next check-in frequency for each endpoint.

Figure 1:
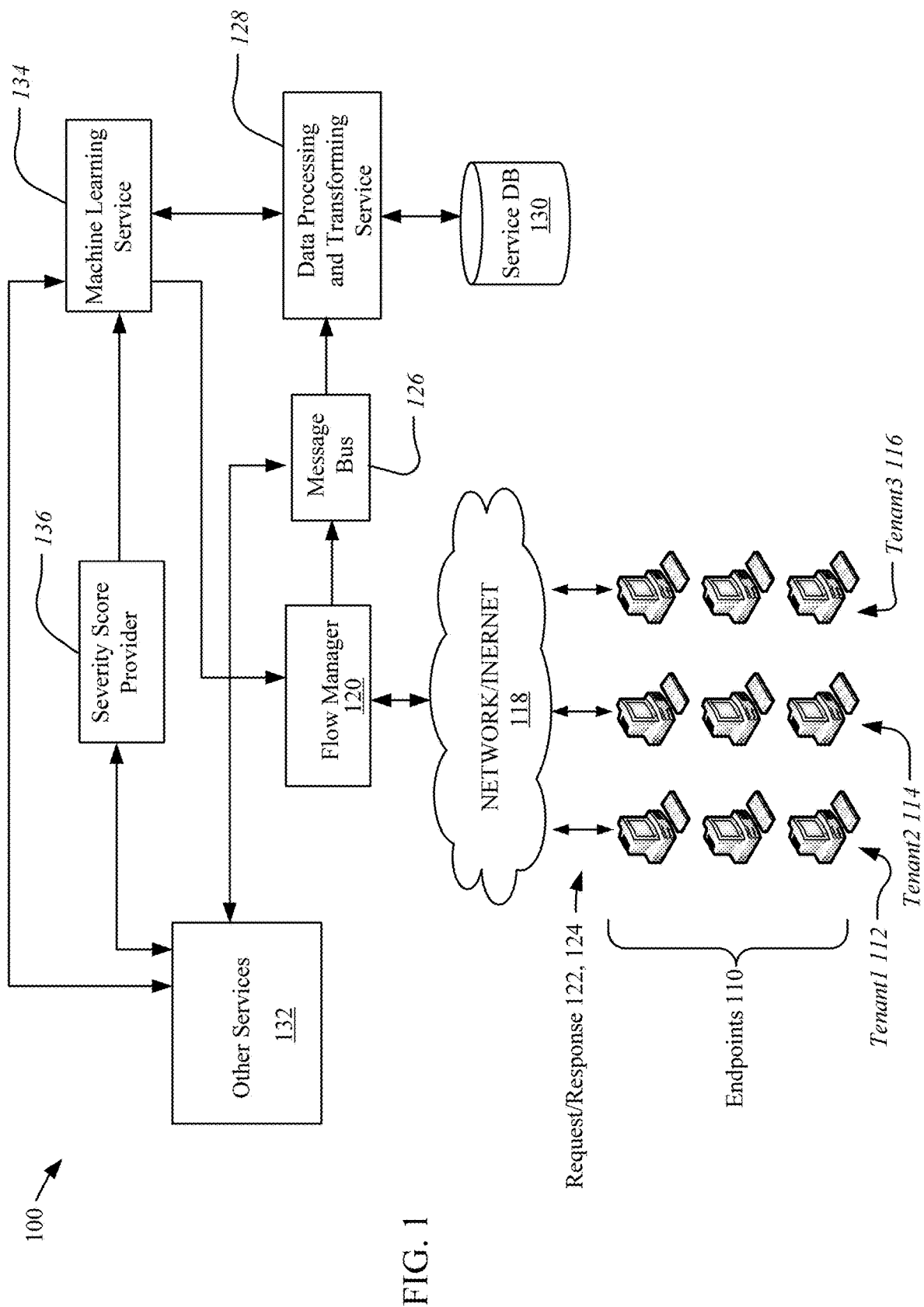
FIG. 1 illustrates an update management system which dynamically controls a next check-in frequency with machine learning to optimize service peak load and velocity of change management as described herein.

FIG. 1 illustrates an exemplary software update management system 100. The system 100 provides software updates to endpoints 110. Endpoints 110 may include servers, desktop computers, laptops, smart phones or any other computer system capable of receiving software updates. The endpoints 110 may be divided into one or more groups referred to as tenants. The tenants may be a group of endpoint computers associated with a location, a client, or other logical or physical grouping. In the illustrated example, the endpoints 110 are grouped into tenant1 112, tenant2 114 and tenant3 116. The endpoints 110 in tenant1 112, tenant2 114 and tenant3 116 each communicate with a flow manager 120 over a network 118. The network 118 may include any combination of systems that carry digital network traffic such as a local area network or the internet. The endpoints 110 communicate with the flow manager 120 by sending check-in requests 122 and then receiving a response 124 from the flow manager 120 as described further below.

Still referring to FIG. 1, the flow manager 120 is a service which provides a web endpoint connection. The web endpoint connection is used by the endpoints 110 to communicate with the update management system 100. The flow manager 120 is the primary interface to all endpoints 110 and is responsible to gather information from other entities and services to generate a next set of instructions for the endpoints to execute. The flow manager 120 communicates over a message bus 126 to a data processing and transforming service 128. The data processing and transforming service processes data and stores the data on a service database 130. The flow manager 120 further communicates with a machine learning service 134, and interacts with a severity score provider 136 and other services as described further below. The flow manager 120, message bus 126, data processing and transforming service 128, machine learning service 134, severity score provider 136 and other services 132 may be located on one or more local, or cloud-based computers or servers. Each of these entities are described further below.

As introduced above, the flow manager 120 communicates over a message bus 126 to a data processing and transforming service 128 which stores data on a service database 130. The message bus 126 is a general purpose message bus which is also commonly referred to as a "service bus". A service bus is used to decouple applications and services from each other where data is transferred between the different applications and services using messages. In a service bus such as message bus 126, the data transferred in the messages can be any kind of information such as structured data encoded in a common format used by the applications. In this example, the message bus 126 is an event-based communication mechanism between the different cloud services, which eliminates the need of storage and makes the communications as near real-time as possible.

The data processing and transforming service 128 in the example of FIG. 1 is a worker role realized as an instance within a cloud service which is typically an always running process. The data processing and transforming service subscribes to change event notifications to perform data cleansing and storing into the database. Once the data has been stored, the data processing and transforming service notifies other listener services of the data change. Further, the data processing and transforming service stores data on a service database 130.

The machine learning service 134 provides a machine learning algorithm as described further below which determines the next-checkin interval to be assigned to each endpoint across all tenants where the next-checkin interval is optimized to reduce network calls and at the same time result in high execution efficiency of the update management system 100. The machine learning service 134 can be implemented with a cloud based machine learning service such as Microsoft's Azure Machine Learning Studio. Based on the business requirements, the machine learning service 134 may choose one of the different algorithms to compute the next check-in frequency. Once a formula for computing the next check-in frequency is selected, the machine learning service uses a scaling mechanism to either accelerate or decelerate the next check-in frequency based on all the input metrics. In the illustrated example below, a scaling factor is added to the machine learning algorithm for the machine learning service to accelerate or decelerate the next check-in frequency.

Other services 132 include services used by the update management system 100. The other services 132 may include business logic or third party software providing these services. Examples of the other services 132 include inventory services and rollout services. Inventory services ensure the update management system is able to store the most recent change information about all the endpoints across all tenants. For Inventory Service to be able to store up to date information, it requests the flow manager to issue collect inventory commands to endpoints across all tenants that request a current inventory of each of the endpoints.

Another example service included in other services 132 is rollout services. The responsibility of the rollout service is to ensure that each of the endpoints are caught up to the latest updated bits from the service providers, while maintaining safe velocity to ensure right change is delivered to the endpoints when they are ready for it.

The update management system 100 may further include a severity score provider 136. The severity score provider 136 may be implemented as a stand atones service as shown or may be incorporated into the other services. When there are multiple services involved with competing priorities resulting in a need of different sync-frequencies, the severity score provider determines a severity score for each of the other services and feeds it to the machine learning service 134, where the severity score indicates the relative importance of the service being up to date on an endpoint. Using the severity score, the machine learning service 134 sets the best score per service to enable optimal next checkin frequency. For example, the inventory service is responsible to make sure it has current information about the installed applications on any given endpoint. In many cases if this information is delayed by a couple of days it not of significant consequence, so the severity score provider would determine that the severity score for inventory service might be given a lower lower score, such as 0.5 or less. In another example, the rollout service is responsible to ensure that all the endpoints are running latest secure version of application. Therefore, it is critical that this service is able to perform its operations as near real time as possible. Therefore, the severity score provider would determine that the severity score for the rollout service would be given a higher score higher, such as 0.6 or higher.

As introduced above, the machine learning service 134 provides a machine learning algorithm which determines the next-checkin interval to be assigned to each endpoint. The check-in frequency algorithm may use the following inputs to compute the next check-in frequency: historic check-in frequency, current network load, severity score, and non-empty payload rate. The historic check-in frequency, current network load and non-empty payload rate are stored in the data processing and transforming service database. These metrics are computed based on the number of requests and responses being transacted via the flow manager. In the illustrated example, the input parameters to the machine learning algorithm are defined as follows:

1. Scaling Factor— The scaling factor is set by the machine learning service to scale the generated next check-in frequency to an optimal value where the non-empty_payload_rate is as high as possible given the other inputs and keeping the current network load in an acceptable range. If the non-empty_payload_rate is high then the scaling_factor can be lowered to return a lower next check-in frequency causing the endpoints to check-in with flow manger more frequently to ask for work. If the non-empty_payload_rate is low, then the scaling_factor can be increased to return a higher next check-in frequency which results in the endpoints checking in with flow manger less frequently. Based on the values of non-empty_payload_rate, the scaling_factor is adjusted to return a higher next check-in frequency.
2. Historic check-in frequency— This input metric may be derived from historic check-in patterns as the average distance between two check-in intervals. This metric may be improved by removing anomalies. In this example, the historic check-in frequency is measured in seconds. Alternatively, other time units may be used.
3. Current network load on services— This metric may be realized by measuring the total unprocessed events/messages in the message bus (126 in FIG. 1). In this example, the current network load on services is expressed as a fraction of the total load.
4. Severity score of other services— This metric may be realized as a variable based on the criticality of the instructions the service provides. For example, during patch Tuesday's the rollout service might have a higher severity score while after the updates, it might go down. In this example, the severity score is expressed as a number between 1 and 0.1. In the illustrated example, the highest severity score determined for any service is used to determine the next check-in frequency.
5. Non-empty payload rate— This metric is a rolling average over 100 check-in responses where there was an action/instruction delivered to the endpoint. This metric determines how many times a non-empty payload was delivered to the endpoint. In this example, the non-empty payload rate is expressed as a fraction of number of times a non-empty payload is sent divided by the total number of empty and non-empty responses.

Using the above input metrics, an example of the machine learning algorithm for the next check-in frequency may be as follows:

Next Check-in Frequency=scaling_factor*[historic_check-in_frequency+(current_network_load*100/severity_score)−non-empty_payload_rate*100]

The machine learning algorithm generates an optimal value for next check-in frequency where non-empty_payload_rate is as high as possible and the current_network_load is within an acceptable range given the other inputs. Some correlations of the metrics include:
1. Next check-in frequency is directly proportional to the non-empty_payload_rate
2. Next check-in frequency is directly proportional to the current_network_load
3. Next check-in frequency is inversely proportional to the severity_score
4. Next check-in frequency is directly proportional to the scaling_factor
5. Historic_check-in_frequency is derived out of next check-in frequency across 100 check-ins.

The machine learning algorithm seeks to find an optimal balance between next check-in frequency where the non-empty_payload_rate is as high as possible and current_network_load is below a desired threshold while the other metrics change. The desired threshold for the current_network_load may be 0.5 to 0.75 for example. The severity_score may vary between 0.1 and 1. With these modulations, the scaling_factor is used to adjust the next check-in frequency which subsequently influences the historic_check-in_frequency. The machine learning algorithm may be submitted to a machine learning service which uses machine learning to find the balance between the non-empty payload rate and the current network load by adjusting the metrics of the algorithm such as the scaling factor as described above.

FIG. 2 illustrates a table 200 that illustrates the input metrics and resulting new check-in frequency of the next check-in algorithm as described above. The table 200 may include metrics for each endpoint in the update management system 100. In this example, the table shows the metrics and parameters for one endpoint Tenant1 112 shown in FIG. 1. The columns of the table 200 include tenantID 210, deviceID 212, scaling_factor 214, historic_check-in_fequency 216, current_network_load 218, severity_score 220 and next check-in frequency 224. The tenantID 210, deviceID 212, identify the endpoint for the other parameters in the same row. The scaling_factor 214, historic_check-in_fequency 216, current_network_load 218, severity_score 220, and non_empty_payload_rate 222 correspond to the input metrics of the algorithm as described above, which in turn are used by the machine learning service 134 to determine the next_check-in_frequency 224 as described above.

Still referring to FIG. 2, as described above, the table 200 may include metrics for each endpoint in the update management system 100. The metrics are evaluated by the next check-in algorithm to produce a new check-in frequency for each endpoint. For example, in table 200 shown in FIG. 2, each row includes metrics gathered for the endpoint with a tenantID of "1" and a deviceID of "1" at a given point in time. The data in the first row 226 includes the scaling_factor 214 is 1, the historic_check-in_frequency 216 is "90", the current_network_load 218 is "0.75", the severity_score 220 is "0.5", and the non-empty payload rate 222 is 0.8. Using these values in the above formulae gives a new check-in frequency for the endpoint=1*[90+(0.75*100/0.5)−0.8*100)]=160. The machine learning service 134 provides the new check-in frequency for the endpoint (145) to the flow manager which sends the new check-in frequency to the endpoint.

Still referring to FIG. 2, the second row 226 represents data for the endpoint with a tenantID of "1" and a deviceID of "1" at a subsequent point in time. At this subsequent point in time, the current network load has increased to 0.9. The devices at this time will now have the input values (scaling factor: 1.0, historic_check-in_frequency: 90; current_network_load: 0.9; severity_score: 0.5; non-empty_payload_rate: 0.8) and resulting in check-in frequency of 190 mins. When devices start checking in every 190 mins the network load may decrease and thereby reduce subsequent changes to the next_check-in_frequency as shown in the data of the third row 228. But as the next_check-in_frequency decreases, the non-empty_payload_rate is also reduced. Given the reduction in the non-empty_payload_rate the machine learning may determine to set the scaling factor for the current data in the third row 228 to 1.1. This results in a next_check-in_frequency of 209 as shown. The machine learning service 134 (FIG. 1) continues to monitor the data and set the scaling factor to optimize the non-empty_payload_rate and the current_network_load. In the illustrated example, the machine learning service 134 is attempting to keep the non-empty_payload_rate to about 0.8 and the current_network_load to about 0.75 or less.

Figure 3:
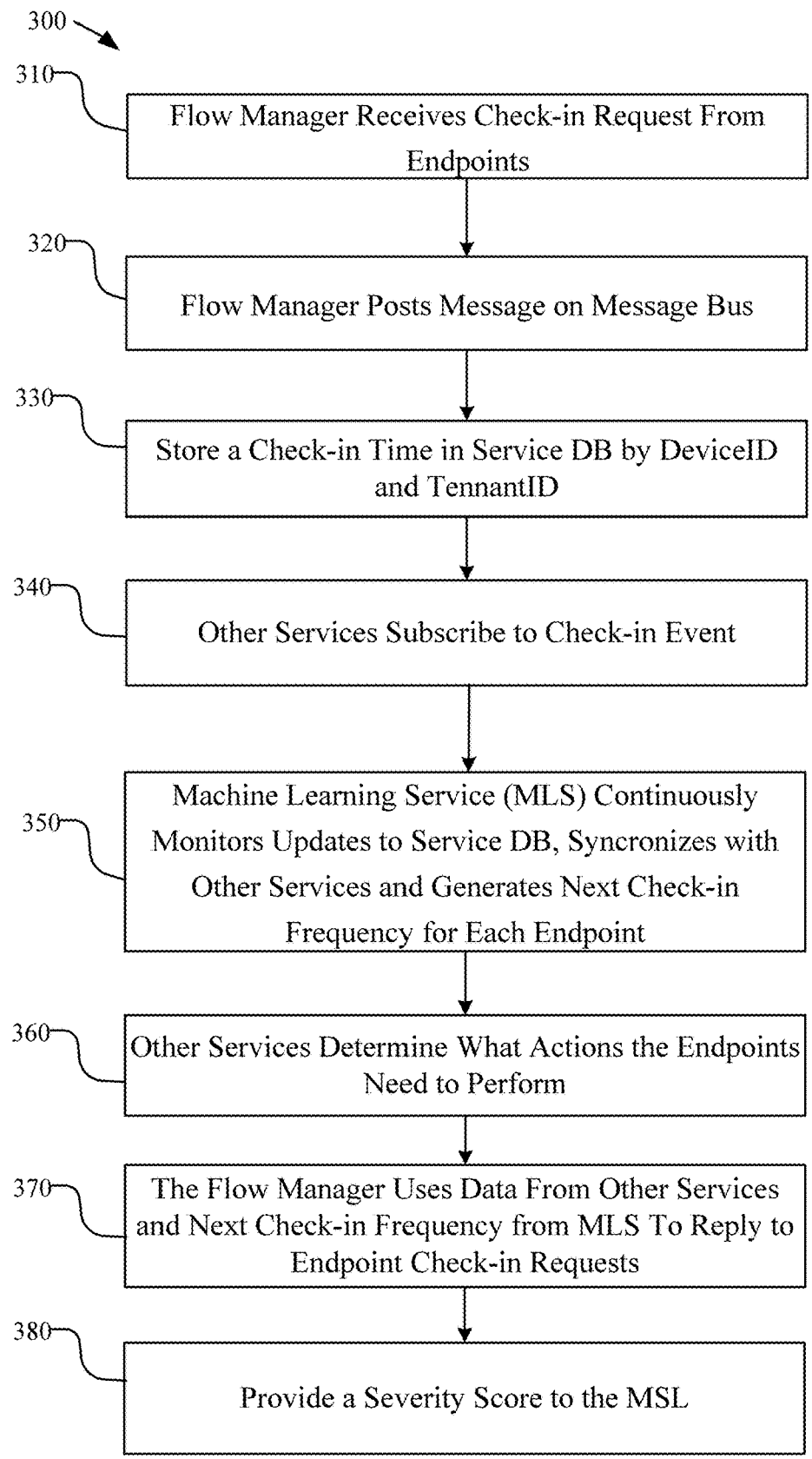
FIG. 3 illustrates an example of a method for dynamically controlling a next check-in frequency in an update management system.

FIG. 3 is an example implementation of a process 300 for dynamically controlling check-in frequency in an update management system. First, the process 300 begins by the flow manager receiving check-in requests from the endpoints (step 310). The check-in request by each of the endpoints is sent using the previous or historic check-in frequency. The flow manager then posts a message on the message bus to the data processing and transforming service (step 320). The message posted on the service bus includes the tenantID and endpointID of the request, may also include a timestamp when the request was received. The check-in time of the check-in request is stored in the service database by deviceID and tenantID by the data processing and transforming service (step 330). The other services subscribe to the check-in event to obtain the information in the message (step 340). The other services can then use the message bus to gain information about the check-in requests of each of the endpoints.

The process 300 continues by the machine learning service (MLS) generating a check-in frequency for each endpoint (step 350). The MLS may continuously monitor updates to the service database for data to determine the new check-in frequency using, for example, the algorithm described above. The generated check-in frequency is provided to the flow manager to be sent to the endpoints.

The other services determine what actions the endpoints need to perform (step 360). Examples of the other services include inventory services and rollout services. These services provide direction for updating the endpoint to the flow manager.

The flow manager uses the data from the other services and the next check-in frequency from the MLS to reply to the endpoint check-in requests (step 370). The endpoints then use the next check-in frequency for scheduling subsequent check-in requests. The next check-in frequency can be used to update the historic check-in frequency. The flow manager obtains the data from the other services via the message bus framework and the service database 130 described above.

A severity score is provided to the MLS (step 380). The severity score may be provided by a severity score provider (FIG. 1, 136). The severity score provider may be implemented as a stand alones service or may be incorporated into the other services as described above. The severity score is used as an input to the MLS to determine the next check-in frequency as described above. The highest severity score determined for any service may be used to determine the next check-in frequency by the machine learning service as described above.

Figure 4:
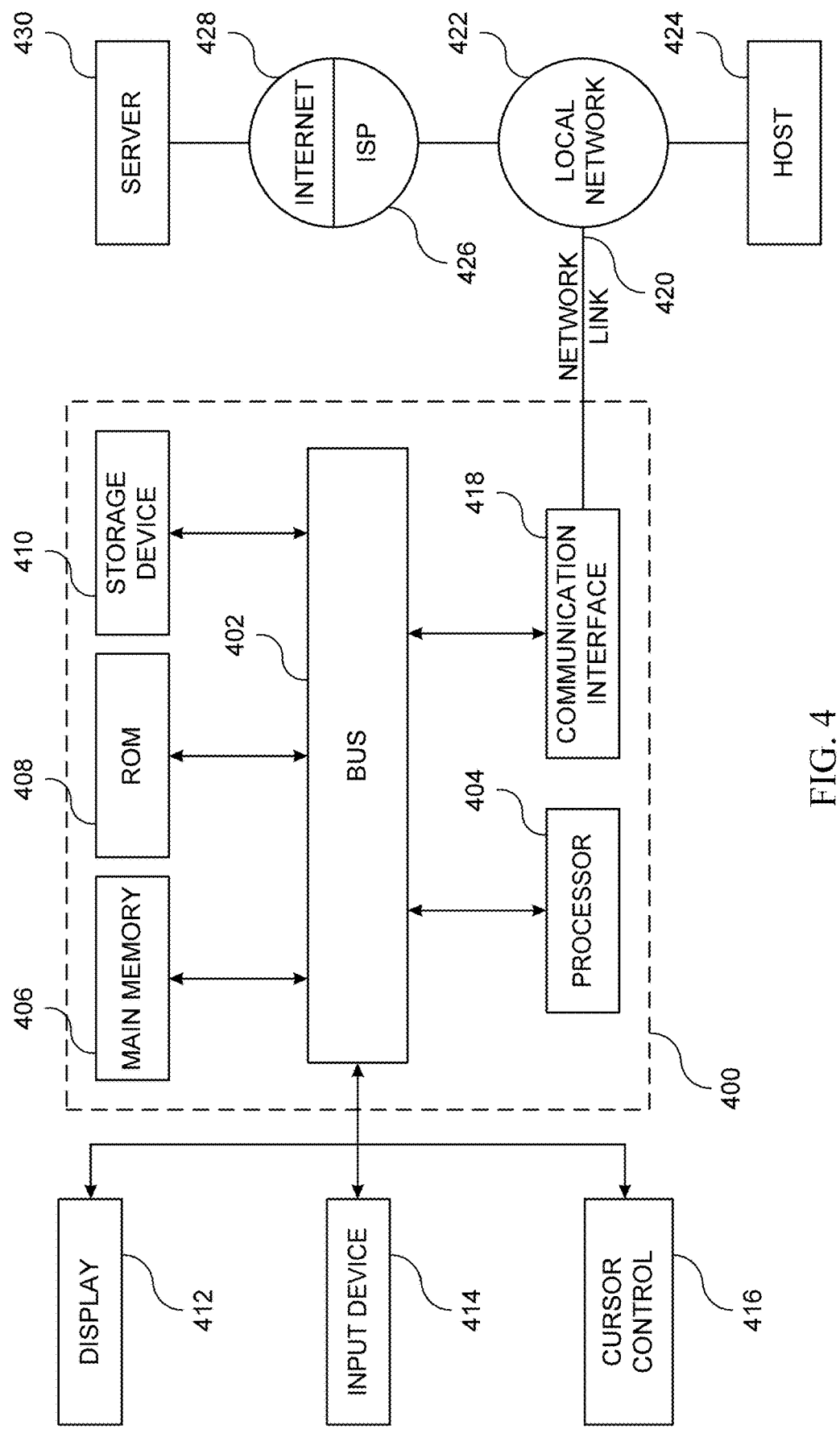
FIG. 4 is a block diagram showing an example computer system upon which various implementations of this disclosure may be implemented.

FIG. 4 is a block diagram showing an example computer system 400 upon which various implementations of this disclosure may be implemented. The computer system 400 may include a bus 402 or other communication mechanism for communicating information, and a processor 404 coupled with the bus 402 for processing information. The computer system 400 may also include a main memory 406, such as a random-access memory (RAM) or other dynamic storage device, coupled to the bus 402 for storing information and instructions to be executed by the processor 404. The main memory 406 may also be used for storing temporary variables or other intermediate information during execution of instructions to be executed by the processor 404.

The computer system 400 may further include a read only memory (ROM) 408 or other static storage device coupled to the bus 402 for storing static information and instructions for the processor 404. A storage device 410, such as a flash or other non-volatile memory may be coupled to the bus 402 for storing information and instructions.

The computer system 400 may be coupled via the bus 402 to a display 412, such as a liquid crystal display (LCD), for displaying information. One or more user input devices, such as the example user input device 414 may be coupled to the bus 402, and may be configured for receiving various user inputs, such as user command selections and communicating these to the processor 404, or to the main memory 406. The user input device 414 may include physical structure, or virtual implementation, or both, providing user input modes or options, for controlling, for example, a cursor through cursor control 416, visible to a user through display 412 or through other techniques, and such modes or operations may include, for example virtual mouse, trackball, or cursor direction keys.

The computer system 400 may include respective resources of the processor 404 executing, in an overlapping or interleaved manner, respective program instructions. Instructions may be read into the main memory 406 from another machine-readable medium, such as the storage device 410. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 410. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 400 may also include a communication interface 418 coupled to the bus 402, for two-way data communication coupling to a network link 420 connected to a local network 422. The network link 420 may provide data communication through one or more networks to other data devices. For example, the network link 420 may provide a connection through the local network 422 to a host computer 424 or to data equipment operated by an Internet Service Provider (ISP) 426 to access through the Internet 428 a server 430, for example, to obtain code for an application program or an internet web page.

As used herein, "computer-readable" medium" refers to a device, such as storage device 410, able to temporarily or permanently store instructions and data that cause computer system or machine to operate in a specific fashion. The term "computer-readable medium," as used herein, does not encompass transitory electrical or electromagnetic signals per se (such as on a carrier wave propagating through a medium); the term "computer-readable medium" may therefore be considered tangible and non-transitory. Non-limiting examples of a non-transitory, tangible computer-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "computer-readable medium" applies to a single medium, or combination of multiple media, used to store instructions for execution by a computer system, such as mobile device, such that the instructions, when executed by one or more processors, cause the system to perform and one or more of the features described herein. Accordingly, a "computer-readable medium" may refer to a single storage device, as well as "cloud-based" storage systems or storage networks that include multiple storage apparatus or devices.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device for dynamically controlling a next check-in frequency in an update management system comprising:
  a processor; and
  a memory in communication with the processor, the memory comprising executable instructions that, when executed by the processor, cause the processor to control the device to perform functions of:
    receiving a check-in request from an endpoint;
    posting a message on a message bus with check-in information including a check-in time;
    storing the check-in time of the message in a database;
    generating a next check-in frequency for each endpoint based on information stored in the database; and
    replying to endpoints with the generated next check-in frequency allowing the endpoints to send future check-in requests with the next check-in frequency.

2. The device of claim 1, wherein generating the next check-in frequency includes a machine learning service that continuously monitors updates to the database and uses machine learning to generate the next check-in frequency.

3. The device of claim 2, wherein the machine learning service adjusts a scaling factor used to generate the next check-in frequency.

4. The device of claim 1, further comprising other services subscribing to check-in events on the message bus determining what actions the endpoint needs to perform.

5. The device of claim 4, further wherein the actions the endpoint needs to perform are sent to the endpoint in the reply with the generated next check-in frequency.

6. The device of claim 1, further comprising providing a severity score of other services which is then used to generate the next check-in frequency where the severity score indicates a relative importance of a service being up to date on the endpoint.

7. The device of claim 6, wherein the severity score is provided by a severity score provider that monitors the other services and stores the severity score in the database.

8. The device of claim 6, wherein the next check-in frequency is generated using the severity score, a historic check-in frequency, a current network load, and a non-empty payload rate.

9. The device of claim 8, wherein the next check-in frequency is equal to a scaling factor*[historic check-in frequency+(current network load*100/severity score)−non-empty payload rate*100].

10. A method of operating a device, comprising:
  receiving a check-in request from an endpoint;
  posting a message on a message bus with check-in information including a check-in time;
  storing the check-in time of the message in a database;
  generating a next check-in frequency for each endpoint based on information stored in the database; and
  replying to endpoints with the generated next check-in frequency allowing the endpoints to send future check-in requests with the next check-in frequency.

11. The method of claim 10, wherein generating the next check-in frequency includes continuously monitoring updates to the database and using machine learning to generate the next check-in frequency.

12. The method of claim 11 wherein the machine learning adjusts a scaling factor used to generate the next check-in frequency.

13. The method of claim 11, further comprising other services subscribing to check-in events on the message bus, determining what actions the endpoint needs to perform, and sending the actions the endpoint needs to perform to the endpoint.

14. The method of claim 10, further comprising providing a severity score of other services which is then used to generate the next check-in frequency where the severity score indicates a relative importance of a service being up to date on the endpoint.

15. The method of claim 14, wherein the severity score is provided by a severity score provider that monitors the other services and stores the severity score in the database.

16. The method of claim 15, wherein the next check-in frequency is generated using the severity score, a historic check-in frequency, a current network load, and a non-empty payload rate.

17. The method of claim 16, wherein the next check-in frequency is equal to a scaling factor*[historic check-in frequency+(current network load*100/severity score)−non-empty payload rate*100].

18. A method of operating a device, comprising: receiving a check-in request from an endpoint; posting a message on a message bus with check-in information including a check-in time; storing the check-in time of the message in a database by device and tenant; generating a next check-in frequency for each endpoint based on information stored in the database with a machine learning service; replying to endpoints with the generated next check-in frequency allowing the endpoints to send future check-in requests with the next check-in frequency; other services subscribing to check-in events on the message bus determining what actions the endpoint needs to perform; and providing a severity score of other services which is then used to generate the next check-in frequency where the severity score indicates a relative importance of a service being up to date on the endpoint, wherein the next check-in frequency is generated using the severity score, a historic check-in frequency, a current network load, and a non-empty payload rate.

19. The method of claim 18, wherein the next check-in frequency is equal to a scaling factor*[historic check-in frequency+(current network load*100/severity score)−non-empty payload rate*100].

20. The method of claim 18, wherein the machine learning service adjusts a scaling factor used to generate the next check-in frequency.

* * * * *